United States Patent [19]

Knox

[11] Patent Number: 4,523,779
[45] Date of Patent: Jun. 18, 1985

[54] PIPE COUPLING AND SEALING DEVICE THEREFOR

[76] Inventor: Granville S. Knox, 1323 Santa Margarita Dr., Fallbrook, Calif. 92028

[21] Appl. No.: 643,551

[22] Filed: Aug. 23, 1984

[51] Int. Cl.³ .............................................. F16L 13/10
[52] U.S. Cl. .................................... 285/294; 285/21; 285/369; 285/417
[58] Field of Search ....... 285/297, 292, 294, DIG. 16, 285/21, 369, 417

[56] References Cited

U.S. PATENT DOCUMENTS

| | | | |
|---|---|---|---|
| 339,036 | 3/1886 | Wilbur | 285/294 |
| 376,458 | 1/1888 | Wilbur | 285/294 X |
| 1,292,072 | 1/1919 | Rooney | 285/294 |
| 2,739,829 | 3/1956 | Pedlow et al. | 285/292 X |
| 3,826,521 | 7/1974 | Wilhelmsen | |
| 3,920,268 | 11/1975 | Stewing | 285/297 X |
| 3,971,574 | 7/1976 | Curtin | |
| 3,977,704 | 8/1976 | Meyer | 285/294 X |
| 4,281,856 | 8/1981 | Litman et al. | |

FOREIGN PATENT DOCUMENTS 534920 12/1956 Canada .
51-79318 7/1976 Japan .

*Primary Examiner*—Richard J. Scanlan, Jr.
*Attorney, Agent, or Firm*—William W. Haefliger

[57] ABSTRACT

A coupling for joining two pipe sections, having end terminals, comprises:
(a) a collar forming a through opening and having bore surfaces bounding said opening to closely receive a pipe section so that the collar is movable axially of the pipe section into coupling position spanning a joint formed by said end terminals,
(b) the collar having associated well means communicating with said surfaces and extending outwardly thereof for reception of flowable cement,
(c) and means to pressurize said cement supplied to said well means to cause flow of the cement between said surfaces and said pipe sections to bond the collar to the sections and to seal off therebetween.

17 Claims, 8 Drawing Figures

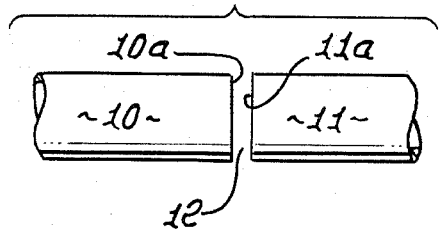
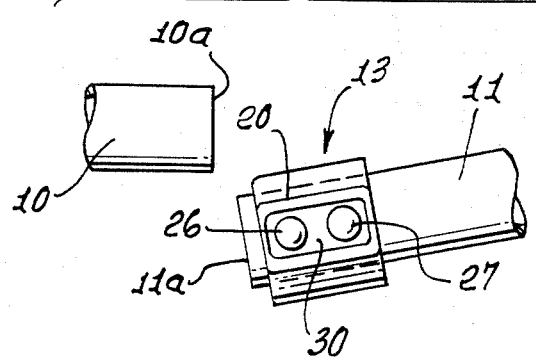
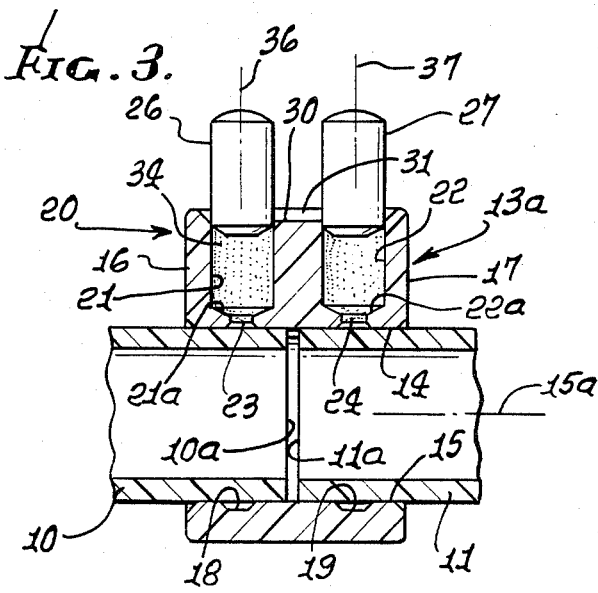
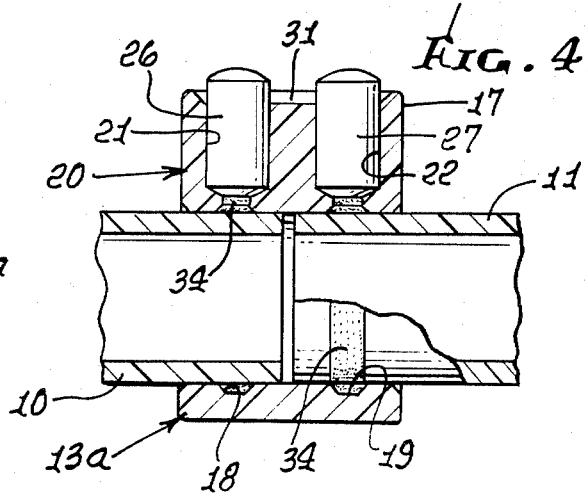
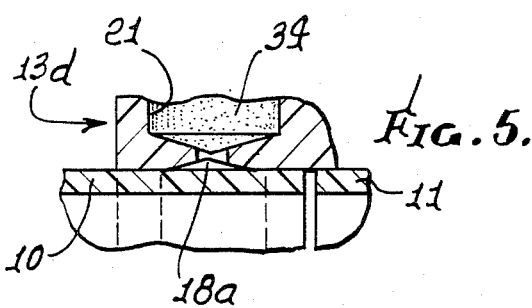
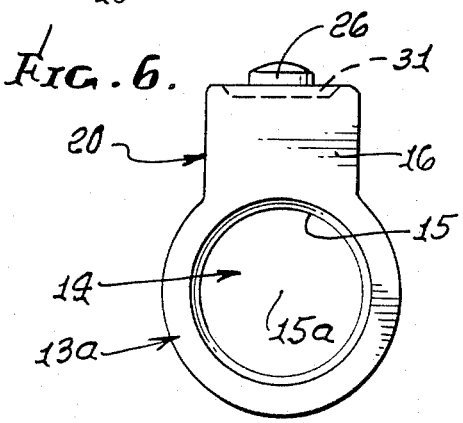
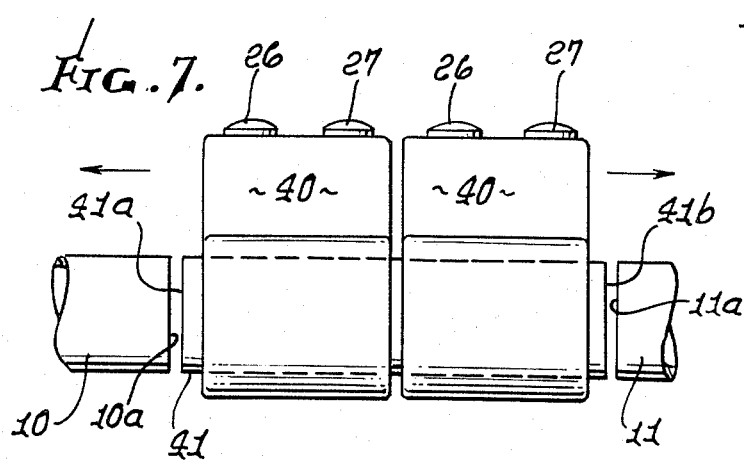
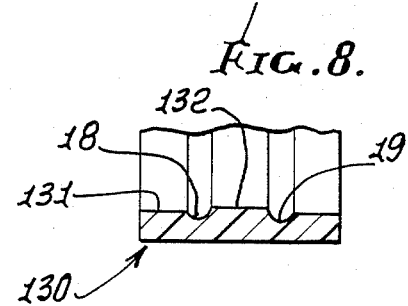

PIPE COUPLING AND SEALING DEVICE THEREFOR

BACKGROUND OF THE INVENTION

This invention relates generally to pipe couplings, and more specifically to couplings characterized as speeding the repair of underground piping systems as commonly used in the irrigation of avocado and citrus groves.

Such systems generally comprise a number of twenty foot lengths of plastic pipe extending horizontally in rows, which are usually spaced about twenty feet apart. The lengths of pipe in each row are usually connected to each other by a pipe tee, to which is attached a vertical length of pipe commonly called a riser. The horizontal rows of pipe are usually buried twelve to eighteen inches below the ground surface with the vertical length of pipe or riser extending some distance above the ground. A sprinkler head is attached to the upper end of the riser and serves to distribute water around an adjacent tree.

Citrus and avocado groves usually have about ninety trees per acre of ground, and since each tree has its own sprinkler, it is clear that each grove acre would have at least about 1800 feet of underground piping. Also, since the lengths of pipe are connected by a pipe tee, there are approximately 270 glued, or cemented, underground connections per acre. This type of underground irrigation system, over a period of time, is subject to damage of various kinds which must be repaired.

Probably the most common damage is caused by roots of trees in the grove. As such trees mature, their roots become quite massive and they often press against the underground pipes with sufficient force to crack or break them. Heavy rains occasionally cause earth movement which can cause stresses in the piping sufficient to cause some of the glued connections to loosen and leak and therefore necessitate repair. Also, grove workers, grove machinery and even burrowing animals may occasionally damage the underground piping.

The repair of underground piping in a grove is made particularly difficult by the tree roots, many of which must be severed before the damaged pipe can be fully uncovered. However, the most difficult problem is that of re-connecting the ends of the pipe after a damaged-pipe section has been replaced. Heretofore, it has been necessary to uncover many feet of pipe on each side of the damaged section to provide sufficient pipe flexibility to permit re-connection of the pipe ends after the damaged section had been repaired. The excavation of a trench of sufficient length to permit pipe upward flexing for repair was difficult, time consuming, and expensive in terms of labor cost.

It should be pointed out that the flexing of the pipe and insertion of the pipe end into the standard pipe collar for re-connection has to be accomplished within a few seconds after the glue or cement had been applied to the pipe end. Otherwise, the pipe end would not enter the coupling, as commercial grades of plastic pipe cement are quick setting compounds. Consequently, the re-connecting maneuver was never easy.

SUMMARY OF THE INVENTION

It is a major object of the invention to provide a pipe coupling which is easily installed, and which removes the necessity for making an extensive excavation (i.e. "trenching") as described above; therefore, damage to tree roots is minimized. Also, the invention obviates the prior need to flex the pipe upwardly for final re-connection, or insertion of the pipe end into the pipe collar, since the improved coupling can be installed at pipe sub-surface level.

Another major object of the invention is to provide a coupling for joining two spaced ends of plastic pipe in a manner which will assure a pressure tight leak proof, seal between the coupled members. This is accomplished by providing means for holding the interfitting parts in close axial alignment and then providing a predetermined annular space for reception of a liquid pipe cement for bonding the coupled members securely together.

Another object of the invention is to provide a coupling which can be sealed and secured to the pipe ends with liquid cement after the coupling has been positioned accurately thereupon. This feature permits the use of close fits between collar and pipe ends, as desired for good alignment of the sealing surfaces, because the collar can be bumped into position, if necessary, as speed in positioning is not critical as it is in couplings which must be cemented before positioning.

Close alignment of the parts is desireable to provide uniform clearances between the mating parts for the reception of the liquid pipe cement. This is to prevent glue starved areas which may result in immediate leakage or later leakage, when the pipe sections are subjected to internal pressure.

Basically, the invention is embodied in a coupling for joining two pipe sections having end terminals, the coupling comprising (a) a collar forming a through opening and having bore surfaces bounding said opening to closely receive a pipe section so that the collar is movable axially of the pipe section into coupling position spanning a joint formed by said end terminals, (b) the collar having associated well means communicating with said surfaces and extending outwardly thereof for reception of flowable cement, (c) and means to pressurize said cement supplied to said well means to cause flow of the cement between said surfaces and said pipe sections to bond the collar to the sections and to seal off therebetween.

Further, and as will be seen, the surfaces bounding the through opening may include a bore and two annular recesses sunk in the bore, the recesses axially spaced apart to respectively extend about the pipe sections; the well means may comprise two wells respectively in communication with the two recesses; and the means to pressurize the cement may comprise individually operable plungers respectively received in the wells, and adapted to be cement bonded to the coupling body.

One of the pipe sections may comprise an extension adapted to be placed and retained in alignment with the other pipe section, and the extension may be fitted between two pipe sections to be aligned by two couplings as described, and cemented in sealed position.

These and other objects and advantages of the invention, as well as the details of an illustrative embodiment, will be more fully understood from the following specification and drawings, in which:

DRAWING DESCRIPTION

FIG. 1 is a side elevation showing two plastic pipe ends to be connected;

FIG. 2 is a view like FIG. 1, but showing the manner of installing the sealing collar of the invention to one of the pipe ends, and before final movement of the collar into sealing position;

FIG. 3 is an enlarged fragmentary section, showing the collar moved into position bridging the two pipe ends; and being operated to effect a seal;

FIG. 4 is a view like FIG. 3, and showing the positions of the elements upon completion of sealing;

FIG. 5 is an enlarged fragmentary section showing another embodiment of the annular recess shown in FIG. 3;

FIG. 6 is an end view of the FIG. 4 apparatus;

FIG. 7 is a side elevation showing a modification in which two collars are employed, in connection with the use of a pipe extension; and FIG. 8 shows a modification of the FIG. 3 coupling but having stepped aligning and sealing bores.

DETAILED DESCRIPTION

In FIG. 1, two synthetic resin pipe sections 10 and 11 are separated at gap 12, between their terminals 10a and 11a. FIG. 2 shows one of the sections such as section 11, pulled sidewardly to receive a coupling 13 which is described in detail herein.

As shown in FIGS. 3–6, the coupling comprises a collar which may consist of synthetic resin or plastic material. The collar typically comprises a one-piece body 13a forming a through opening 14 to closely receive the pipe sections in opposite ends of the opening, so that the collar is movable axially of the pipe sections into coupling position spanning the joint and gap 12 formed between the end terminals 10a and 11a. The opening 14 has surfaces bounding the opening, and as shown in the example such surfaces include a cylindrical bore 15 which extends through the body 13a to intersect opposite ends 16 and 17 of the body. The bore axis appear at 15a. The bore 15 may have slidable engagement with the outer surface of the pipe sections to snugly align the sections and to form clearances adapted to receive flowable or liquid cement, under pressure.

The surfaces bounding the opening 14 typically also include two shallow annular recesses 18 and 19 sunk in the bore at axially spaced locations, so as to respectively extend about the pipe sections, the recesses being axially spaced endwise inwardly from the ends 16 and 17 of the collar body.

The body 13a includes an integral boss 20 which is adapted to project upwardly in installed position. Located in the boss is well means, as for example two wells 21 and 22 which communicate with the body surface associated with opening 14. In the example, the bottom end 21a and 22a of each well directly communicates via passages 23 and 24 with the annular recesses 18 and 19, as shown, whereby flowable cement may be directly supplied under pressure from the wells via 23 and 24 to the two recesses and then to the clearances between the collar body bore and the outer surfaces of the pipe sections, for bonding the parts together, and establishing good annular seals therebetween.

Means to pressurize the cement 34 in the wells to effect such pressurized flow of the cement from the wells is shown in the example to comprise plungers 26 and 27, which also may consist of molded synthetic resin. As indicated, the wells may have cylindrical bores 21 and 22 which intersect the upper side 30 of the boss, at a tray 31 into which cement may be poured to initially fill the wells.

The plungers may also be generally cylindrical and sized to closely interfit the well bores. When the plungers are pressed downwardly, as shown in FIG. 4, the liquid cement in the wells is driven under pressure into the annular recesses and clearances, as referred to above and also seen in FIG. 5. The plungers then bond to the body to form a closed pressure tight seal between the interior and exterior of the body.

Wells 21 and 22 define lateral axes 36 and 37, as shown. In FIG. 7, two like collars 40 are provided each included an annular body 13a the same as in FIGS. 3 and 4, and otherwise having the same recess, well and plunger elements as in FIGS. 3 and 4. An associated plastic pipe extension 41 has end terminals 41a and 41b adapted to be fitted endwise and in alignment with pipe section terminals 10a and 11a to form joints therewith. One collar 40 is adapted to be moved endwise to span the joint formed between terminals 10a and 41a and the other collar 40 is adapted to be moved endwise to span the joint between terminals 11a and 41b, each collar thus being positioned to seal off between the extension 41 and a pipe section as described above in FIGS. 3 and 4. Note that the collars also align the extension and pipe sections due to close sliding interfits with same.

FIG. 5 shows another configuration of the annular recess shown in FIG. 3. The FIG. 5 configuration is believed to be particularly efficient in distributing the pressurized liquid cement uniformly around the circumference of the pipe. The maximum clearance between the pipe 10 and collar 13d occurs at the central apex of the recess permitting free annular flow in this part of the recess when the liquid cement in well 21 is pressurized. Additional pressurization spreads the liquid cement axially and into the closer fitting outer zones of recess 18a.

FIG. 8 is a fragmentary section showing a modified collar body 130 having stepped bores 131 and 132. Bore 132 is sized to closely fit pipe sections 10 and 11 for centering the pipes in the collar. Bores 131 are sized slightly larger than bore 132 to provide a predetermined small annular clearance between the pipe and collar into which liquid cement from annular grooves 18 and 19 is forced when liquid cement 34 is pressurized in wells 21 and 22. See FIG. 3. This construction provides an additional annular sealing zone wherein there is no surface to surface contact between pipe sections 10 and 11 and bores 131. In this manner the possibility of forming glue starved areas in the sealing zones is eliminated.

I claim:

1. In a coupling for joining two pipe sections having end terminals, the combination comprising
    (a) a collar forming a through opening and having bore surfaces bounding said opening to closely receive a pipe section so that the collar is movable axially of the pipe section into coupling position spanning a joint formed by at least one of said end terminals,
    (b) the collar having associated well means communicating with an annular recess sunk in at least one of said surfaces and extending outwardly thereof for reception of flowable cement,
    (c) and plunger means to pressurize said cement supplied to said well means to cause flow of the cement to said recess,
    (d) the plunger means cemented to said body in said well means after the cement has been pressurized to flow and at least substantially fill said recess.

2. The combination of claim 1 wherein said collar consists of synthetic resin.

3. The combination of claim 1 including said pipe sections, which consist of synthetic resin, the collar spanning said sections and bonded thereto.

4. The coupling of claim 1 wherein said surfaces bounding said opening include two axially spaced bore surfaces to respectively surround two pipe sections, and annular recesses sunk in said surfaces, and an intermediate bore surface to center said pipe sections, said two bore surfaces being slightly larger in diameter than said intermediate bore surface to provide clearance for reception of cement supplied from said recesses.

5. The coupling of claim 1 wherein said surfaces include two annular recesses which define an axis and which are axially spaced apart to respectively extend about the pipe sections.

6. The coupling of claim 5 wherein said well means comprise two wells respectively in communication with said two recesses.

7. The coupling of claim 6 wherein said means to pressurize said cement in said wells comprise two plungers respectively received in said wells.

8. The combination of claim 7 wherein said collar includes a synthetic resinous body forming said wells at one side of said through opening, said wells having generally cylindrical bores and defining lateral axes which extend outwardly of said through opening, said body having an outer surface intersected by said wells, said plungers being generally cylindrical and sized to closely interfit said well bores, there being passages in the body radially outwardly of said annular recesses and communicating said recesses with said wells.

9. The coupling of claim 1 wherein said plunger means are closely received in said well means for movement therein, the plunger means accessible to manual pressure exerted outside the coupling.

10. The combination of claim 1 including a second collar as defined in (a), (b), and (c) of claim 1, and including an associated pipe extension having end terminals respectively adapted to be fitted endwise between said pipe section terminals to form joints therewith, one collar adapted to span the joint formed by the terminals of the extension and one pipe section, and the other collar adapted to span the joint formed by the terminals of the extension and the other pipe section.

11. The combination of claim 10 including said pipe sections extending into the collar through openings, and the extension also extending into the collar through openings.

12. The coupling of claim 1 wherein the liquid capacity of said well means is greater than the liquid capacity of said recess whereby substantially full displacement of the cement from said well means causes the displaced cement to fill said recess and overflow between pipe and collar surfaces.

13. The coupling of claim 1 wherein full inward movement of the plunger means relatively into the well means to effect cement displacement provides visual indication that at least one bore surface and associated pipe section have been fully sealed by said displaced cement.

14. The coupling of claim 1 including orifice means restricting gravity flow of cement from said well means prior to pressurization of the cement by the plunger means.

15. The coupling of claim 1 wherein said annular recess has bore surfaces that taper inwardly and away from a central apex region.

16. In a coupling for joining two pipe sections having end terminals, the combination comprising
   (a) a collar forming a through opening and having bore surfaces bounding said opening to closely receive a pipe section so that the collar is movable axially of the pipe section into coupling position spanning a joint formed by said end terminals,
   (b) the collar having associated well means communicating with said surfaces and extending outwardly thereof for reception of flowable cement,
   (c) and means including plungers to pressurize said cement supplied to said well means to cause flow of the cement between said surfaces and said pipe sections to bond the collar to the sections and to seal off therebetween,
   (d) said surfaces including two annular recesses which define an axis and which are axially spaced apart to respectively extend about the pipe sections,
   (e) said well means comprising two wells respectively in communication with said two recesses, the plungers respectively received in the wells,
   (f) the collar including a synthetic resinous body forming said wells at one side of said through opening, said wells having generally cylindrical bores and defining lateral axes which extend outwardly of said through opening, said body having an outer surface intersected by said wells, said plungers being generally cylindrical and sized to closely interfit said well bores, there being passages in the body radially outwardly of said annular recesses and communicating said recesses with said wells,
   (g) said plungers substantially filling the wells and being cemented to said body.

17. In a coupling for joining two pipe sections having end terminals, the combination comprising
   (a) a collar forming a through opening and having bore surfaces bounding said opening to closely receive a pipe section so that the collar is movable axially of the pipe section into coupling position spanning a joint formed by said end terminals,
   (b) the collar having associated well means communicating with said surfaces and extending outwardly thereof for reception of flowable cement,
   (c) and means to pressurize said cement supplied to said well means to cause flow of the cement between said surfaces and said pipe sections to bond the collar to the sections and to seal off therebetween,
   (d) a second collar as defined in (a), (b) and (c) and including an associated pipe extension having end terminals respectively adapted to be fitted endwise between said pipe section terminals to form joints therewith, one collar adapted to span the joint formed by the terminals of the extension and one pipe section, and the other collar adapted to span the joint formed by the terminals of the extension and the other pipe section,
   (e) and including said pipe sections extending into the collar through openings, and the extension also extending into the collar through openings.
   (f) said means to pressurize the cement including two plungers in cement wells in each collar, the plungers fully inserted into the wells and bonded to the collars, cement extended from the wells bonding the collars to the pipe sections and extension.

* * * * *